United States Patent [19]
Uno

[11] Patent Number: 5,405,240
[45] Date of Patent: Apr. 11, 1995

[54] THREE-DIMENSIONAL SHEET BLOCK STACKING SYSTEM

[76] Inventor: Tadao Uno, 1-84, Matsugaoka 1-chome, Chigasaki-shi, Kanagawa-ken, Japan

[21] Appl. No.: 997,885

[22] Filed: Dec. 29, 1992

[30] Foreign Application Priority Data

Jun. 23, 1992 [JP] Japan .................................. 4-189871

[51] Int. Cl.6 ............................................. B65G 57/06
[52] U.S. Cl. .............................. 414/794.2; 414/790.7; 414/331
[58] Field of Search .................. 414/331, 790.7, 790.9, 414/791.1, 794.2

[56] References Cited

U.S. PATENT DOCUMENTS

| | | | |
|---|---|---|---|
| 2,510,678 | 6/1950 | Bower | 414/790.7 X |
| 3,410,423 | 11/1968 | Brockmüller | 414/791.1 X |
| 5,106,259 | 4/1992 | Anderson et al. | 414/331 X |

Primary Examiner—David A. Bucci
Assistant Examiner—Janice L. Krizek
Attorney, Agent, or Firm—Wenderoth, Lind & Ponack

[57] ABSTRACT

At least two sheet-block stack formation units are positioned in vertical alignment, and are parallel to each other. A distribution elevator is disposed on one end of the group of units in order to supply sheet blocks to each of the units. A collection elevator is disposed on the other end of the group of units in order to supply stacks of sheet blocks formed at the respective units to the next processing step.

8 Claims, 8 Drawing Sheets

THREE-DIMENSIONAL SHEET BLOCK STACKING SYSTEM

BACKGROUND OF THE INVENTION

1. Field of the Invention

This invention relates to a three-dimensional sheet block stacking system used for forming a predetermined number of stacked-sheet blocks (or stacks of sheet blocks) by stacking up a predetermined number of sheet blocks.

2. Description of the Prior Art

Example of the type of sheet blocks mentioned above include banknotes, lottery tickets, postcards, various kinds of tickets, etc. It is a common practice that these sheets are piled up and bound per unit of, for example, 100 sheets, then 10 of such piles of sheets are stacked up and bound to form a stacked-sheet block (or stack of sheet blocks) in series (1 to 1000), and are then delivered from a printing factory. This system or device for forming the stacked-sheet blocks is used after the process of printing and forming piles of sheets has been carried out. In order to satisfy the on-line working conditions between the two processes, the second process is required to be able to correspond in speed to the first process.

A conventional sheet block stacking system or device of this type has an intermittent rotary drum. A number of pocket groups for receiving the sheet blocks are arranged on the surface of the drum in a circular pattern as seen in plan view. The piles of sheets are inserted into the pockets of the drum in series. Then, the piles of sheets are gradually taken out of the pockets so as to be stacked up in series.

According to the above prior art, it is necessary for the workers to insert the piles of sheets temporarily into the pockets of the rotary drum in series and then take them out of the pockets so as to be stacked up. It takes much time and labor to change the arrangement of the pockets. It sometimes becomes necessary to prepare additional spare drum having a different arrangement. To this end, a storage space is required and therefore, the prior art is very inefficient and uneconomical. Particularly, it is actually impossible to form stacked-sheet blocks at the high speed required by today's high speed printing.

SUMMARY OF THE INVENTION

It is therefore an object of the present invention to provide a sheet block stacking system capable of easily performing the work for forming stacked-sheet blocks (or sheet block stacks) by stacking up a predetermined number of sheet blocks such as the piles of sheets described above, in a highly efficient and economical manner.

Another object of the present invention is to provide a three-dimensional sheet block stacking system capable of forming a large quantity of stacked-sheet blocks in a very limited space.

To achieve the above objects, in one aspect of the present invention, there is essentially provided a three-dimensional sheet block stacking system comprising a plurality of vertically aligned, horizontal block formation units in parallel and which are adapted to form at least two blocks of stacked-sheets, a block distribution elevator disposed adjacent to one end (first end) of the group of block formation units and adapted to supply block sheets to the block formation units, and a block collection elevator disposed adjacent to the other end (second end) of the group of block formation units and adapted to transfer the stacked-sheet blocks, which are formed by the block formation units, to the next process location.

From another aspect of the invention, there is also provided a three-dimensional sheet block stacking system comprising a stacked-sheet block formation unit adapted to form at least two stacked-sheet blocks by stacking a plurality of sheet blocks, the unit comprising an upper-stage sheet block pool lane disposed at an upper stage, and a lower-stage stacked-sheet block pool lane disposed right under the upper-stage sheet block pool lane, the upper-stage sheet block pool lane comprising a sheet block pool table capable of being opened and closed between a carrying position where a plurality of sheet blocks are supported on a plurality of upper pool stations, and a release position where the support is removed, and the sheet blocks are dropped, and upper transfer means adapted to transfer the sheet blocks onto a predetermined upper pool station of the sheet block pool lane, the lower-stage stacked-sheet block pool lane comprising a stacked-sheet block pool table adapted to stack up the sheet blocks dropped from the upper-stage sheet block pool lane on lower pool stations, and lower transfer means adapted to transfer a predetermined number of stacked-sheet blocks on the lower pool stations of the stacked-sheet block pool table toward the next process location.

According to the present invention, the units for forming the stacked-sheet blocks are disposed in vertical alignment and parallel to one another thus forming a multi-stage structure. A distribution elevator is disposed at one end (first end) of the group of units and is capable of traveling vertically, and a collection elevator is disposed on the other end (second end) and is capable of traveling vertically. While distributing the sheet blocks to the units of respective stages and removing the stacked-sheet blocks from the units, the stacked-sheet blocks can be formed on the units of the respective stages.

Accordingly, a space, in plan view, occupied by the sheet block stacking system can be reduced considerably. The space required for installing the system of the present invention is as small as the space which is required for installing a single stacked-sheet block formation unit. Through coaction of three elements, i.e., stacked-sheet formation units disposed in vertical alignment and parallel to one another so as to form a multi-stage structure, a distribution elevator capable of traveling vertically, and a collection elevator likewise capable of traveling vertically, the work for consecutively forming the stacked-sheet blocks can be carried out reasonably and efficiently.

According to the present invention, a two-stage structure is available in which each of the stacked-sheet block formation units include upper stage block station disposed above lower stage block stations. Accordingly, the sheet blocks are temporarily supported in order on the upper pool stations on the upper stage sheet block pool tables and then dropped onto the lower pool stations on the lower stage stacked-sheet block pool table by opening the sheet block pool tables. As a result, a predetermined number of stack of blocks can be easily formed in a series. Furthermore, by properly setting the pool stations, a large quantity of stacked-sheet blocks can be produced at a time (in other words, mass production is available).

The present invention can be advantageously used as a system or device for stacking up bound piles of sheets such as banknotes and postcards in a series. The present invention is likewise advantageously applicable to a system or device for forming stacked-sheet blocks by stacking up a plurality of sheet blocks which are merely piled up individually and not bound.

DETAILED DESCRIPTION OF THE EMBODIMENT

Sheet blocks to be supplied to a sheet block stacking system of the present invention are piles of a large number of sheets. These sheet blocks are supplied to the sheet block stacking system in either banded or non-banded states.

For example, the sheet blocks mentioned above may be piles of banknotes consisting of a constant number of banknotes piled up and banded, or they may be piles of postcards, piles of lottery tickets, piles of bingo cards, piles of various kinds of tickets, etc. The sheet blocks represented by the piles of banknotes, etc. are obtained by piling up a constant number of sheets (for example, 100 sheets) in series. Stacks of sheet blocks or stacked-sheet blocks (or sheet-block stacks) are obtained by stacking up a constant number of the sheet blocks (for example, 10 sheet blocks) in a series.

A sheet block stacking system of the present invention relates to a sheet block stacking system in which a plurality of sheet blocks of the above-mentioned banknotes, etc. are stacked up to form stacks of sheet blocks.

This sheet block stacking system may be applied to such cases where a constant number of sheets of various kinds of paper including multi-folded computer paper and book-making paper are piled up to form sheet blocks, and then a constant number of the sheet blocks are stacked up to form stacks of sheet blocks (sheet-block stacks).

Figure 1:
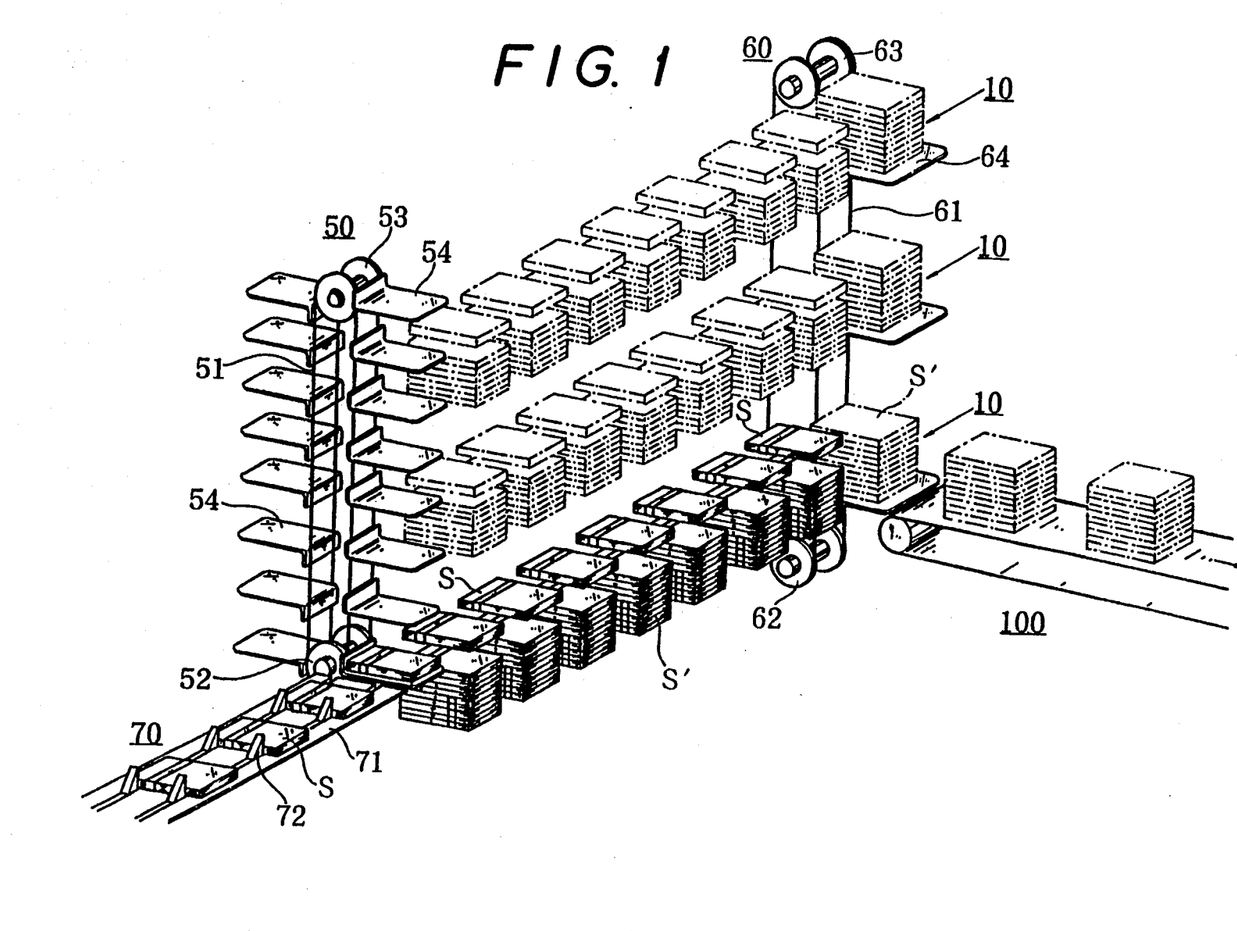
FIG. 1 is a perspective view schematically showing an overall layout of a three-dimensional sheet block stacking system according to one embodiment of the present invention.

The sheet block stacking system includes a plurality of stacked-sheet block (or sheet-block stack) formation units (block formation units) 10 capable of forming, at least two stacked-sheet blocks (or sheet-block stacks) S' at a time by stacking up a plurality of sheet blocks S. The block formation units 10 are horizontally disposed in vertical parallel relation, thus forming a multi-stage structure. A block distribution elevator 50 adapted to supply the sheet blocks S to the block formation units 10 is disposed adjacent to one end of the block formation units 10. A collection elevator 60 adapted to transfer the stacked-sheet blocks S to the next process is disposed adjacent to the other end of the block formation units 10.

As a result of coaction of the three elements, i.e., block formation units 10, distribution elevator 50 and collection elevator 60, the stacks of sheet blocks S' are formed. Owing to the above-mentioned arrangement of the three elements, an average installation space of the system is reduced to a space which is normally required for a single block formation unit to be installed. Therefore, the operation can be carried out efficiently.

Figure 7:
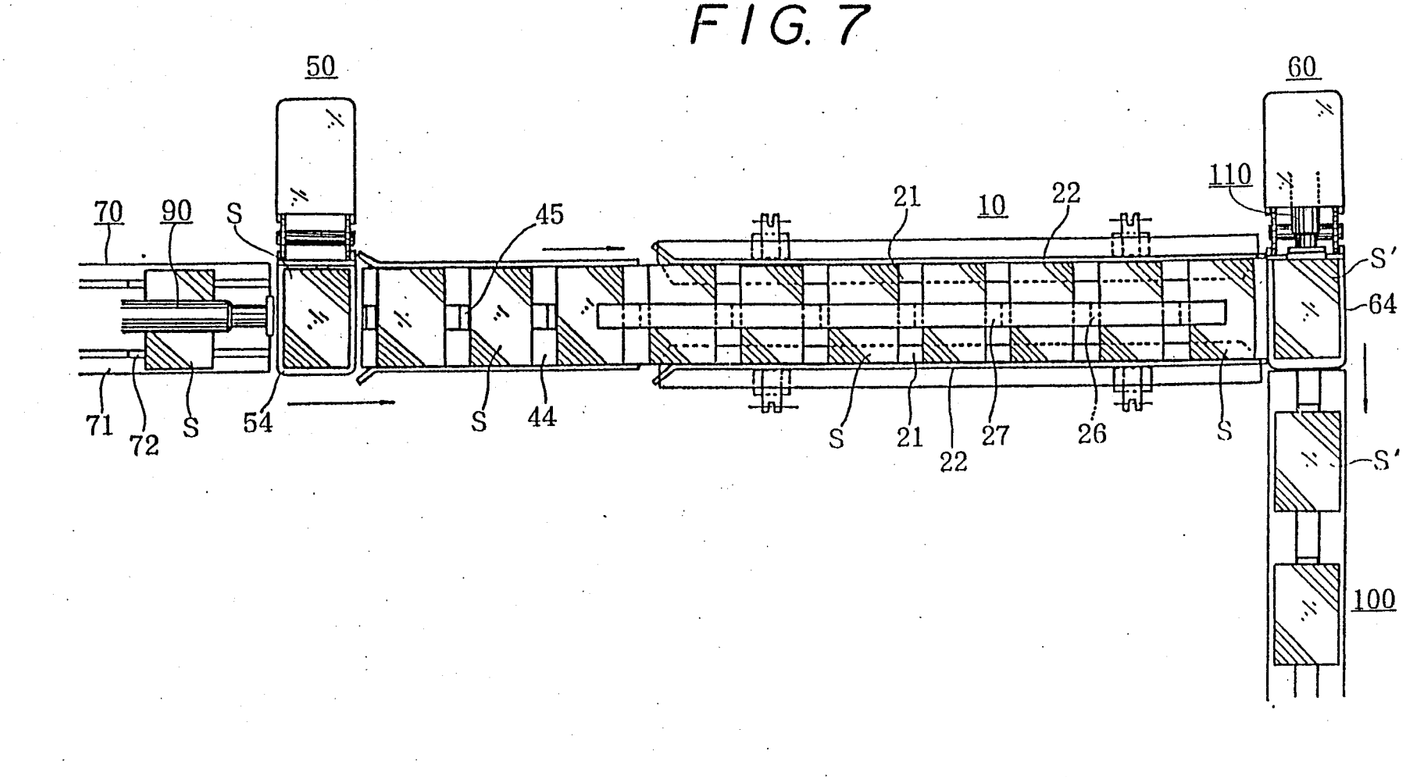
FIG. 7 is a plan view of of the block formation unit.
Figure 8:
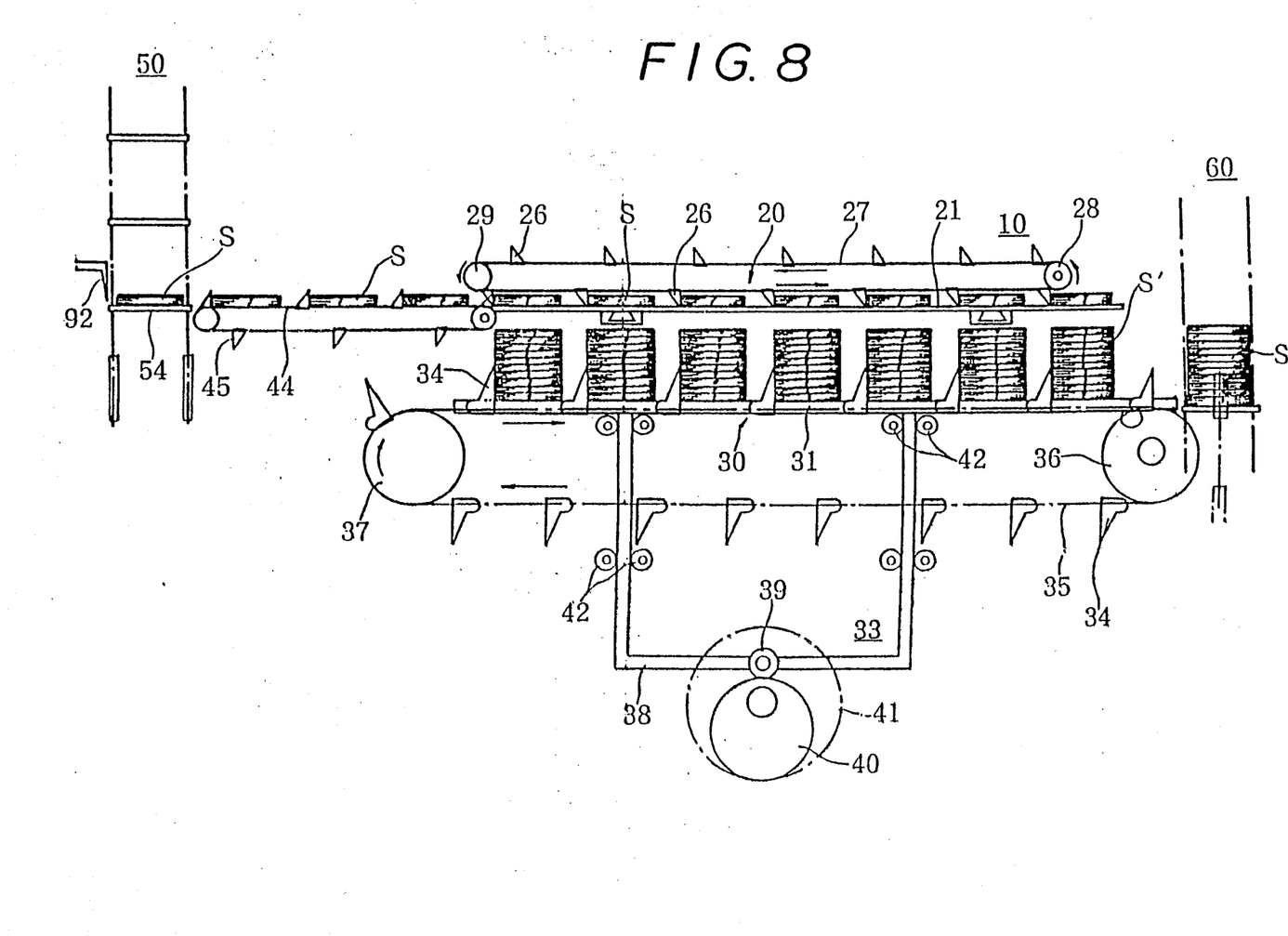
FIG. 8 is a side view thereof.
Figure 9:
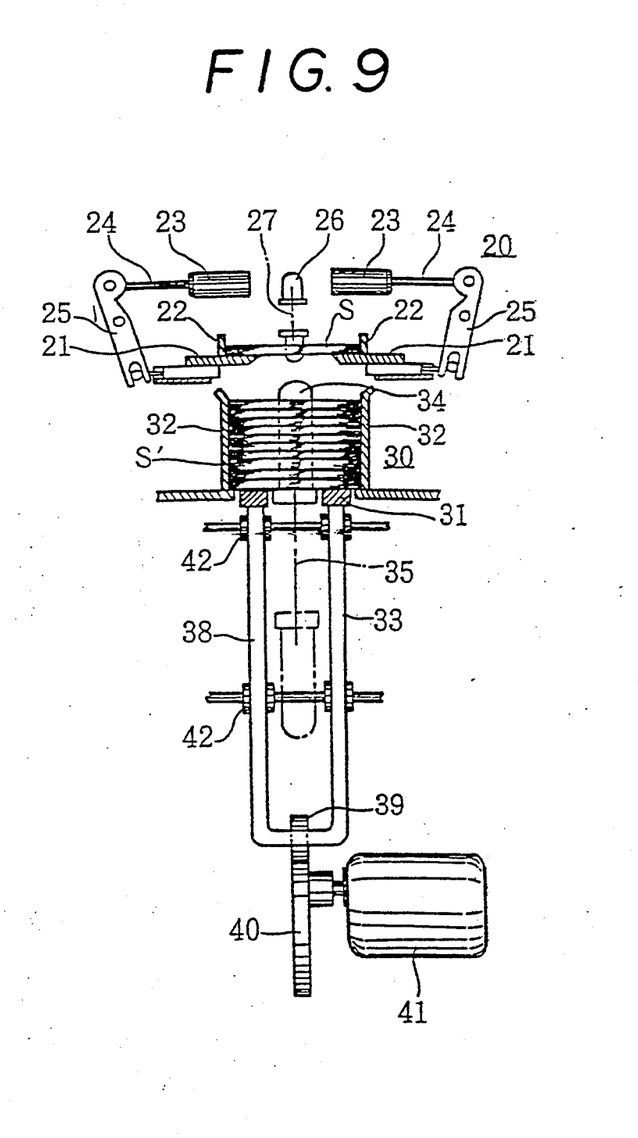
FIGS. 9 through 12 inclusive are sectional views for explaining an operating state of the block formation unit.
Figure 10:
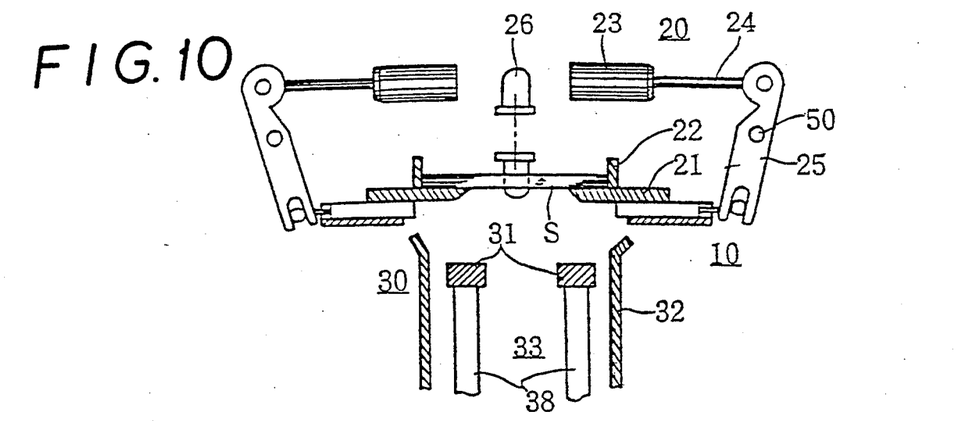
Figure 11:
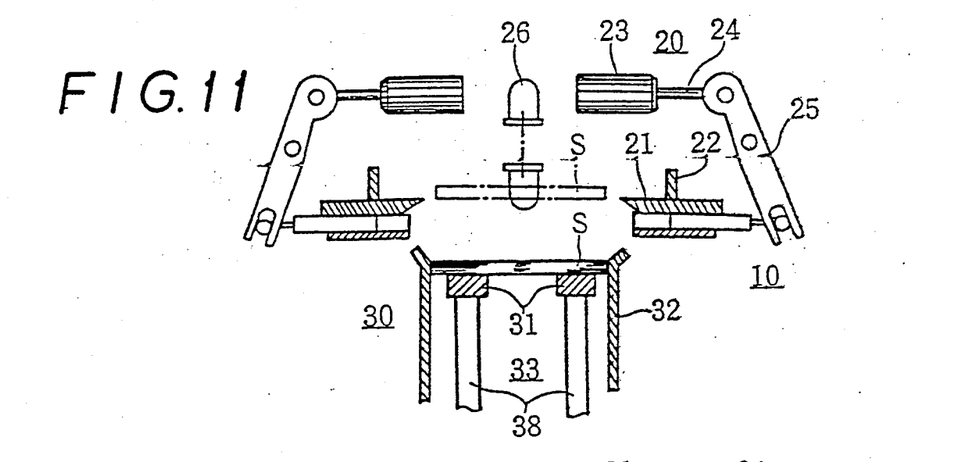
Figure 12:
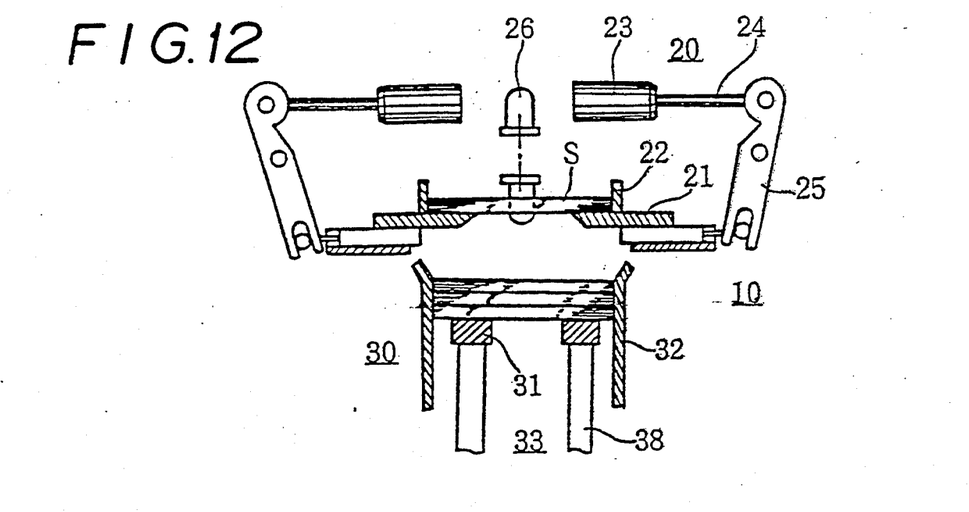

Each block formation unit 10 comprises an upper-stage sheet block pool lane 20 and a lower-stage stacked-sheet block pool lane (or sheet-block stack pool lane) 30.

The upper-stage sheet block pool lane 20 has sheet block pool tables 21 extending in parallel relation with each other and capable of being opened and closed respectively between a support position where the sheet blocks S are supported on the tables 21 and a release position where the support is removed. When in the release position, the tables 21 respectively permit the sheet blocks S to be dropped. The lane 20 also has a pair of regulation plates 22 disposed longitudinally along outer sides of the tables 21 and adapted to regulate (or position) two side surfaces of the sheet blocks S. In order to open and close the tables 21 between the support and release positions, the lane 20 further has hydraulic cylinders 23. Piston rods 24 of the cylinders 23 are connected to the tables 21 through connection levers 25, respectively, so that the cylinders 23 are operated to actuate the connection levers 25 in order to open and close the tables 21.

The upper-stage sheet block pool lane 20 further has an upper transfer means adapted to transfer the sheet blocks S, which are supplied from the distribution elevator 50, onto a plurality of upper pool stations formed on upper surfaces of the sheet block pool tables 21 in an orderly manner. This transfer means comprises at least one pusher 26 for transferring the sheet blocks S to predetermined pool stations, respectively, an endless drive body 27 comprising an endless chain, etc., on which in this embodiment, a plurality of the pushers 26 are mounted at predetermined spaces, and a drive wheel 28 and a driven wheel 29 about which the endless drive body 27 is trained.

The endless drive body 27 and the pushers 26 intermittently travel between and in parallel relation with the sheet block pool tables 21, 21, which are opened and closed with respect to each other. A distance between the adjacent pushers 26 is set in such a manner as to correspond to the maximum dimension of the sheet blocks S, and a number of upper pool stations are formed between pushers 26. That is, the upper pool stations are defined by the pushers 26, the regulation plates 22, and the tables 21, respectively.

Next, the lower-stage stacked-sheet block pool lane 30 has a stacked-sheet block pool table 31 (or sheet-block stack pool table) longitudinally disposed in parallel relation right under the tables 21. The lane 30 also has a pair of regulation plates 32 disposed longitudinally along outer sides of the table 31 and adapted to regulate (or position) two side surfaces of the stacked-sheet blocks S'. The lane 30 further has a device 33 for moving the table 31 upward and downward along the regulation plates 32.

The lane 30 further has a lower transfer means adapted to transfer the stacked-sheet blocks S' onto the lower pool stations formed on the upper surface of the table 31. This transfer means comprises at least one pusher 34 capable of traveling intermittently and functioning to both regulate (or position) a rear end face of each-stacked-sheet block S' and transfer the block S' to a downstream location, an endless drive body 35 on which in this embodiment, a plurality of the pushers 34 are mounted at predetermined spaces, and a drive wheel 36 and a driven wheel 37 on which the endless drive body 35 is trained.

The endless drive body 35 and pushers 34 travel along a central portion of the table 31 in parallel, and a number of the lower pool stations are provided between the pushers 34. That is, the lower pool stations are defined by the pushers 34, the regulation plates 32 and the pool table 31, respectively. The upper pushers 26 and lower pushers 34 are spaced apart at the same intervals, and therefore, there are an equal number of upper and lower pool stations. When the sheet blocks S are dropped onto the pool stations of the lower-stage stacked-sheet block pool lane 30, the two stations are in vertical correspondence (i.e. are vertically aligned). Similarly, when the sheet blocks are dropped, the upper and lower pushers 26 and 34 stand still at positions which are in vertical correspondence (alignment).

After the completion of the first block dropping operation, the upper pusher 26 travels intermittently in cooperative association with the supply of the next block from the distribution elevator 50, and transfers the blocks onto the upper pool stations. After the completion of transfer of the sheet blocks onto the upper pool stations, the second block dropping operation is carried out. On the other hand, when a predetermined number of sheet blocks S are dropped onto the lower pool stations and the formation of the stacked-sheet blocks is completed, the lower pushers 34 travel in order to transfer the stacked-sheet blocks S to the collection elevator 60.

The device 33 for moving the table 31 upward and downward comprises an elevating rod 38 whose upper end is connected to the stacked-sheet block pool table 31, a cam wheel 40 normally urged against a rotor 39 rotatably carried on a lower end of the elevating rod 38, a motor 41 for rotating the cam wheel 40, and guide rollers 42 for guiding the elevating rod 38.

The device 33 supports the pool table 31 in its upper limit position when the first sheet block S is dropped. As the stacked quantity on the table 31 is progressively increased due to dropping of the sheet blocks S, the device 33 lowers the pool table 31 in a step-by-step method until the table 31 reaches its lower limit position where the stacking operation is finished.

The stacked-sheet block formation units 10 thus constructed are disposed in-vertically parallel relation to form a multi-stage structure. The distribution elevator 50 capable of traveling upward and downward is disposed adjacent one end (first ends) of the units 10, while the collection elevator 60 capable of traveling upward and downward is disposed adjacent to the other end (second ends) of the units 10.

The distribution elevator 50 travels intermittently between the stacked-sheet block formation unit 10 on the lowermost stage and the unit 10 on the uppermost stage. The elevator 50 stops at each stage unit in order to supply a predetermined number of sheet blocks. Likewise, the collection elevator 60 travels intermittently between the stacked-sheet block formation unit 10 on the lowermost stage and the unit 10 on the uppermost stage. The elevator 60 stops at each stage unit in order to receive the stacked-sheet blocks S' formed at each stage unit and supply them to the next process.

As examples of the distribution elevator 50 and collection elevator 60, endless drive bodies 51 and 61 such as endless chains, etc. are disposed between the lowermost stage stacked-sheet block formation unit 10 and the uppermost stage stacked-sheet block formation unit 10 such that the endless chain can travel vertically endlessly.

For example, the two member of a double type endless drive body 51 are disposed in parallel between a wheel 52 located on the first end side of the lowermost stage unit 10 and a wheel 53 located on the first end side of the uppermost stage unit 10. The distribution racks 54 are supported on the double type endless drive body 51. Similarly, the two members of a double type endless drive body 61 are disposed in parallel between a wheel 62 located on the second side of the lowermost stage unit 10 and a wheel 63 located on the second end of the uppermost stage unit 10. The collection racks 64 are supported on the double type endless drive body 61.

The distribution racks 54 of the distribution elevator 50 and the collection racks 64 of the collection elevator 60 are arranged at equal spaces, respectively. The distribution elevator 50 has at least a number of distribution racks 54 such that they are arranged at spaces equal to the spaces between stacked-sheet block formation units 10. Likewise, the collection elevator 60 has at least a number of collection racks 64 such that they are arranged at spaced equal to the spaces between units 10. Preferably, the distribution racks 54 are spaced apart by distances which are each equal to a distance obtained by dividing the distance between each pair of space between the units 10 by an integer, so that at least one distribution rack 54 is always disposed between the adjacent units 10.

The sheet blocks S are supplied to the distribution racks 54, respectively, and conveyed to the units 10, respectively, while being supported on the racks 54. On the other hand, the blocks S' formed on the stacked-sheet block formation units 10 are supplied to the next process while being supported on the collection racks 64.

A transfer means 70 is a means for supplying the sheet blocks S formed in the preceding process onto the distribution rack 54 at the lowermost end of the distribution elevator 50. The transfer means 70 comprises a guide table 71 adapted to support and guide the sheet blocks S, and pushers 72 capable of traveling intermittently along the guide table 71. The pushers 72 are mounted on an endless drive body 73, such as an endless chain, at equal intervals. The outlet end or distal end of the means 70 is disposed proximate to the distribution rack 54 at the lowermost end.

The sheet blocks S formed in the preceding process are transferred intermittently by the transfer means 70, and supplied to the distribution racks 54, respectively, at the outlet end or distal end of the means 70. Each sheet block S is pushed onto an upper surface of each distribution rack 54 by each pusher 72 of the transfer means 70.

In order to surely transfer each sheet block S onto each distribution rack 54 from the transfer means 70, a first auxiliary pusher 80 is disposed at a location below the outlet end or distal end of the transfer means 70.

The first auxiliary pusher 80 is adapted to further push the sheet blocks S, which are already pushed toward the distribution racks 54 by the pushers 72, from the transfer means 70 so as to surely supply the sheet blocks S onto the distribution racks 54.

The sheet blocks S are supplied onto the distribution racks 54 only by the pushers 72 of the transfer means 70 or they are supplied to the distribution racks 54 through coaction between the transfer means 70 and the first auxiliary pusher 80.

Figure 6:
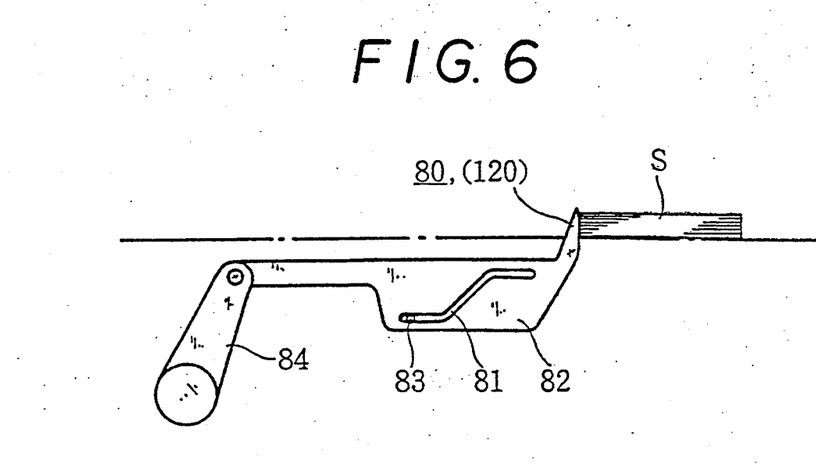
FIG. 6 is a side view exemplifying a first auxiliary pusher for pushing sheet blocks onto the distribution rack and a second auxiliary pusher for pushing stacked-sheet blocks onto the collection rack.

As a concrete example of the first auxiliary pusher 80, as shown in FIG. 6, the first auxiliary pusher 80 is guided to extend upward from below the transfer means 70 by a cam means. When the sheet blocks S are being transferred, the first auxiliary pusher 80 is in a standby position below (outside of) a transferring path, but when the transfer of the sheet blocks is stopped, the pusher 80 advances upward to push the sheet blocks S onto the distribution racks 54.

For example, a cam groove 81 is formed in a support plate 82 integral with the first auxiliary pusher 80, a fixed guide pin 83 is slidably positioned in the cam groove 81, and the support plate 82 is moved forward and backward by moving means such as, for example, a pivotable lever 84.

When the lever 84 is pivoted in one direction, the support plate 82 moves in one direction in accordance with the cam groove 81 and causes the pusher 80 to project upward at an angle from below and to then proceed in that posture to push out the sheet blocks S. On the other hand, when the lever 84 is pivoted in the reverse direction, the support plate 82 moves in the other direction in accordance with the guide groove 81 and causes the pusher 80 to be returned downward at an angle from above, so that the pusher 80 is placed in a standby position awaiting the next push-out operation.

Figure 5:
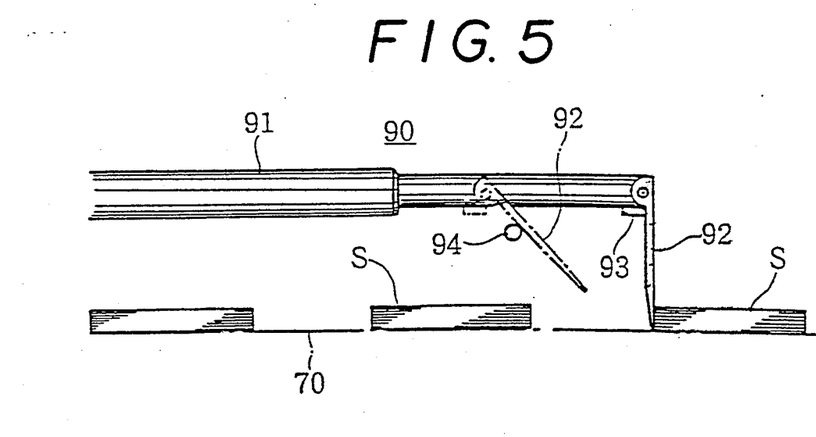
FIG. 5 is a side view showing an inlet means for inserting sheet blocks to a block formation unit (i.e., unit for forming stacks of sheet blocks) from a distribution rack.

As means for shifting the sheet blocks S supplied to the distribution racks 54 from the distribution racks onto the stacked-sheet block formation units 10, inlet means 90 is disposed on the first end side of the stacked-sheet block formation units 10. In this inlet means 90, for example, an inlet pusher 92 is moved forward and backward by a hydraulic cylinder 91. When the pusher 92 is moved forward, the sheet blocks S supported on the distribution racks 54 are pushed onto the stacked-sheet block formation units 10.

With respect to the lowermost stage inlet means 90, as shown in FIG. 5, the pusher 92 is provided in such a manner as to be pivotable, so that when the means 90 is moved forward, the pusher 92 is prevented from pivoting by a stopper 93. When the means 90 is moved backward, the pusher 92 is pivoted, by a stopper 94, to a position outside of the moving paths of the sheet block S which is located on the transfer means 70 for supply to the distribution racks, or the pusher 92 is abutted with the sheet block S which is to be supplied next, so as to be pivoted to a position outside of the moving path of the sheet block S.

When the units 10 correspond to (are aligned with) the distribution racks 54, the inlet means 90 is actuated to supply the sheet blocks S onto the stacked-sheet block formation units 10 from the distribution racks 54.

Figure 3:
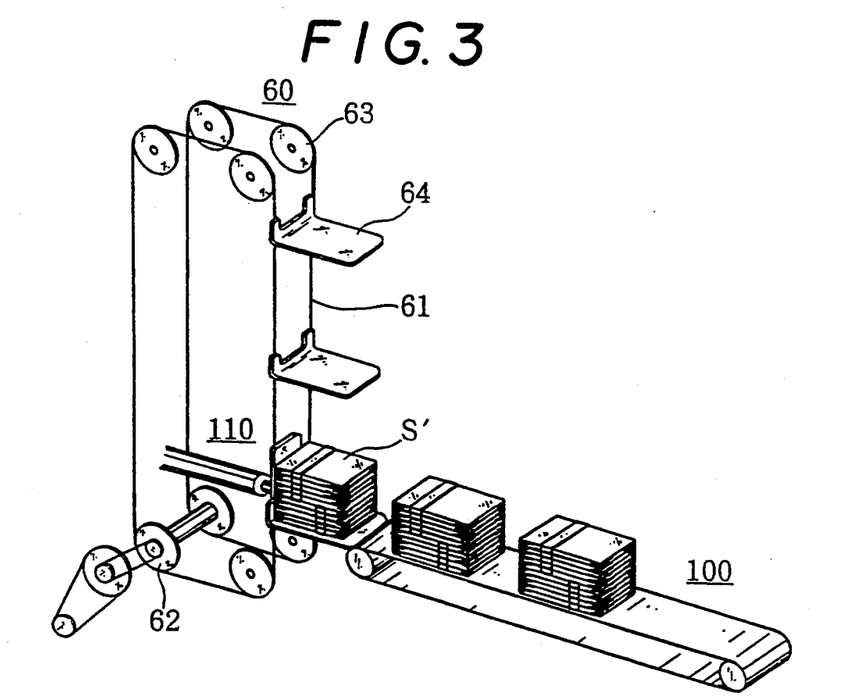
FIG. 3 is a perspective view showing a collection elevator and a stacked-sheet block outlet means (block outlet means)

On the other hand, the collection elevator 60 is provided with a block transfer means 100 adapted to receive the stacked-sheet blocks S' from the collection racks 64 and transfer the same to the next process, and outlet means 110 adapted to shift the stacked-sheet blocks supported on the collection racks 64 onto the transfer means 100.

The block transfer means 100 comprises a belt conveyor or a guide table and a pusher as in the block transfer means 70. The transfer means 100 is located in position generally equal in height to the lower limit position of the stacked-sheet block pool table 31 of the lowermost stage stacked-sheet block formation unit 10. The collection rack 64 is stopped at each stage unit in order to receive the stacked-sheet blocks. The collection rack 64 is stopped between the pool table 31 and the transfer means 100 at a location generally equal in height to them, so that the stacked-sheet blocks S' can be shifted to the transfer means 100 from the collection rack 64 by the outlet means 110.

In order to reliably shift the stacked-sheet blocks onto the collection racks 64 from the pool table 31, the stacked-sheet block formation units 10 are provided at outlet ends or distal ends thereof with second auxiliary pushers 120, respectively. Specifically, as described previously, the stacked-sheet block formation units 10 on the respective stages have lower transfer means comprising the stacked-sheet block pool table 3Land the pusher 34. The second auxiliary pusher 120 is disposed at a lower location of the outlet end or distal end of the pusher. 34, i.e., outlet end or distal end of the stacked-sheet block pool table lowered to the lower limit, so that the stacked-sheet blocks pushed toward the collection racks 64 by the pusher 34 are further pushed by the second auxiliary pusher 120 in order to reliably supply the blocks onto the collection racks.

The stacked-sheet blocks S' are supplied onto the collection racks 64 only by the pushers 34 or they are supplied to the collection racks 64 through coaction between the pusher 34 and the second auxiliary pusher 120. A concrete example of this second auxiliary pusher 120 can be of identical construction as the first auxiliary pusher 80 already described with reference to FIG. 6.

Figure 4:
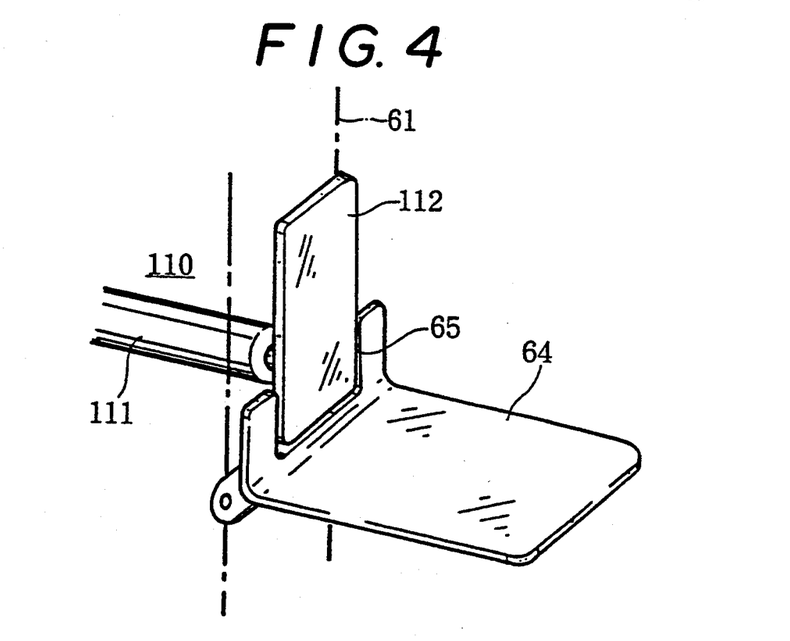
FIG. 4 is a perspective view showing a collection rack and the block outlet means.

The outlet means 110 comprises a pusher 112 which is moved forward and backward by a hydraulic cylinder 111 as shown in FIGS. 3 and 4. For example, this pusher 112 is disposed at the lowest stop position of the collection rack 64, and when the pusher 112 is moved forward, the stacked-sheet blocks supported on the collection racks 64 are pushed onto an inlet end or proximal end of the transfer means 100.

The cylinder 111 and the pusher 112 are disposed between the pair of endless drive bodies 61, such that the pusher 112 proceeds above the collection racks from the backs of the collection racks 64 which are supported on the double drive bodies 61. A cutout 65 is formed in the collection rack 64 at a mounting portion thereof with respect to the drive bodies 61, so that the pusher 112 can be moved in and out through the cutout 65.

As shown in FIG. 7, at an introduction portion of the unit 10, an introduction lane 44 of the sheet blocks S extending on the same straight line as the table 21 of the lane 20 may be provided. This sheet block introduction lane 44 has a number of pushers 45. A space between the adjacent pushers 45 is set to be the same as the space between the adjacent pushers 26 so that both the pushers 26 and 45 travel on the same straight line and mutually communicate.

Accordingly, the sheet blocks S supported on the distribution racks 54 are first taken onto the introduction lane 44 and then transferred onto the sheet block pool lane 20 by the introduction lane 44. That is, by intermittently moving the pushers 45 along the introduction lane 44, the sheet blocks S are passed over to the pushers 26 of the pool lane 20.

Next, a construction of the present invention will be described together with the operation thereof. The sheet blocks S formed in a preceding process are intermittently transferred by the transfer means 70. At the outlet end or distal end of the transfer means 70, the sheet blocks S are pushed out gradually onto the distribution racks 54 by the pushers 72 with the help of the first auxiliary pusher 80.

The distribution racks 54 are intermittently raised. When the distribution racks 54 are stopped, they receive the supply of the sheet blocks S from the transfer means 70 and are then raised again. In this way, the distribution racks 54 carry the sheet blocks S to the entrances of the units 10 on higher stages where the sheet blocks S are pushed onto the respective units 10.

Figure 2A:
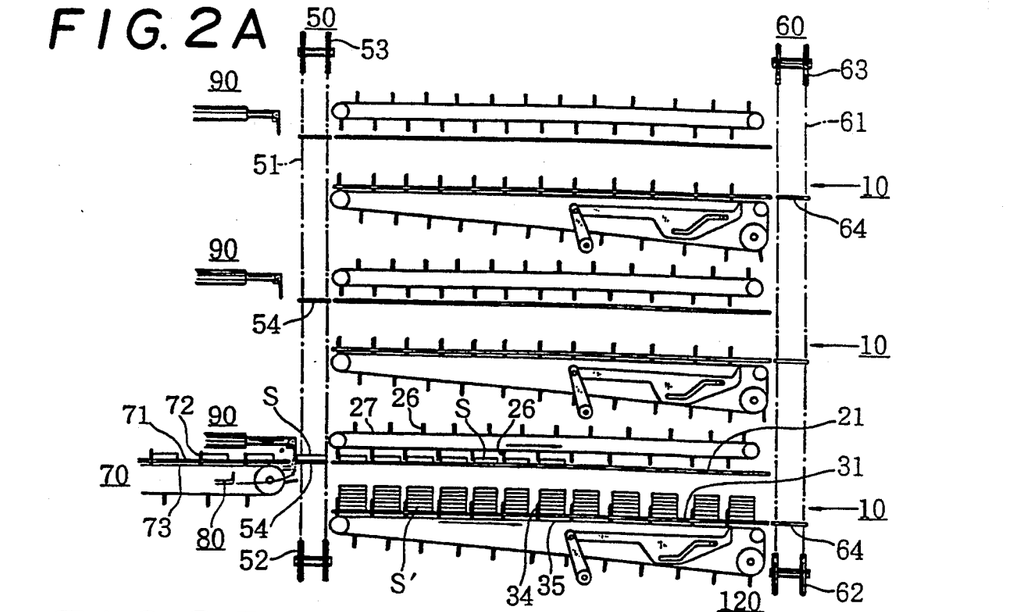
FIG. 2A is a side view showing one example of the sheet block stacking system for forming stacks of sheet blocks.
Figure 2B:
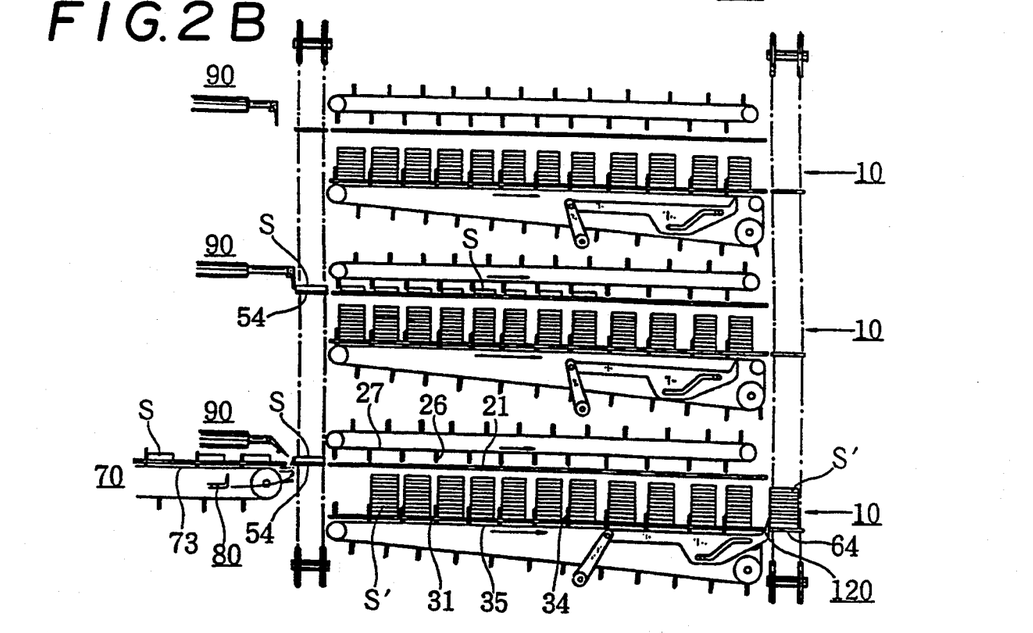
FIG. 2B is a side view showing another example of the sheet block stacking system for forming stacks of sheet blocks.

FIG. 2A shows one example of a method for pushing the sheet blocks S onto the units 10 from the distribution racks 54, and FIG. 2B is another example thereof. In FIG. 2A, after a predetermined number (for example, 10 blocks) of the sheet blocks are stacked up on the lowermost stage unit 10, sheet blocks are pushed onto the second stage unit 10, and after the completion of the stacking-up work on the second stage unit, sheet blocks are pushed onto the third stage unit.

In this method, the sheet blocks S are continuously supplied to the distribution racks 54 from the transfer means 70 while the racks 54 come to stop at the lowermost position in turn. Each time one block is supplied, the lowermost stage inlet means 90 is activated to repeat the operation for pushing the sheet blocks onto the lowermost stage unit 10. At the same time, sheet blocks are transferred to the upper stage pool stations by the pushers 26 which form the upper transfer means.

In this way, the sheet blocks S are pooled (or received) in the upper pool stations of the sheet block pool tables 21 which form the lowermost stage unit 10. Thereafter, the pool tables 21 are opened to drop the sheet blocks S onto the stacked-sheet block pool table 31.

By repeating the above procedure, a predetermined number of sheet blocks S are stacked on the upper surface of the table 31, thereby forming at least two stacked-sheet blocks S' simultaneously. The table 31 stands by at its upper limit position for the first sheet block S to be dropped, and then is lowered, step by step, as more sheet blocks S are stacked. At the lowermost limit position, the stacking work is completed and the stacked-sheet blocks S' are transferred to the next process. That is, when the formation of the blocks S' is completed, the pushers 34 forming the lower transfer means are intermittently actuated to push the blocks S' onto the collection racks 64 one after another. The second auxiliary pusher 120 supplements this pushing operation.

The collection racks 64 are gradually lowered to the exit for the lowermost stage units 10 in order to receive the blocks S', and the blocks S' are shifted to the transfer means 100 by operation of the outlet means 110 so as to be subjected to the next process. As soon as the formation of the stacked-sheet blocks on the lowermost stage unit 10 is completed, another group of the sheet blocks S begins to be pushed onto the second stage unit 10. The distribution racks 54 are stopped until after the completion of the stacking work of a predetermined number of sheet blocks on the lowermost stage unit 10. Next, in order to supply the sheet blocks S to the second stage unit 10, the distribution racks 54 are raised each time they receive one sheet block S and receive the supply of another group of sheet blocks S for the next distribution rack 54.

In this way, the sheet blocks S are gradually supplied to the respective distribution racks 54 of the distribution elevator 50 from the transfer means 70, and these sheet blocks S are brought to the entrance of the second stage unit 10 one after another.

The distribution rack 54 supporting the sheet block S is stopped at a position corresponding to the entrance of the second stage unit 10. While the distribution rack 54 is stopped, the second stage inlet means 90 is activated to push the sheet blocks S, which are gradually and repeatedly brought by the distribution tables 54, onto the second stage unit 10 from the distribution racks 54.

When a predetermined number of sheet blocks have heed stacked up on the second stage unit, the supply of the sheet blocks to the third stage unit is started.

The stacked-sheet blocks 10 formed on the second stage unit are gradually transferred onto the collection racks 64 which come to stop at the exit of the unit, and the collection racks 64 supporting the blocks are lowered to the first stage unit so as to be subjected to the outlet means 110. The sheet blocks are continuously stacked up on the third stage unit, fourth stage unit, and so on.

Referring again to FIG. 2B, prior to the completion of the formation of the stacked-sheet blocks S' on the lowermost stage unit 10, sheet blocks are supplied to upper stage units. In other words, when a group of sheet blocks are supplied onto the lowermost unit in one row, the distribution racks 54 are shifted to the second stage unit in order to supply another group of sheet blocks thereon in one row. In this way, the formation of the stacked-sheet blocks is simultaneously carried out on the respective block formation units.

As described above, the respective distribution racks 54 can be stopped at any stage of the block formation units, and a desired number of sheet blocks S can be supplied to that unit by the inlet means 90. Accordingly, the present invention can be effectively practiced as a system of device for stacking up banknotes, postcards, etc. in a series.

According to the present invention, the sheet block stacking system can be installed in a very limited space, and a large number of stacked-sheet blocks can be efficiently produced in a consecutive manner (that is, mass production is available).

The invention can be advantageously applied to a system or device for stacking up piles of banknotes, postcards, tickets, etc. In accordance with the number of printing faces used in a printing process of these banknotes, etc., the number (quantity) and order (sequential order) of the sheet blocks to be supplied to the block formation units from the distribution elevator can be freely adjusted. As a result, since a single stacking system can be operated to correspond to the output requirements or conditions of the preceding process where the printing face is divided in various ways, the present invention is very advantageous in view of economy.

What is claimed is:

1. A formation unit for use in forming stacks of three-dimensional sheet blocks, said formation unit comprising:

an upper stage sheet block pool lane having a sheet block input end;

a lower stage sheet-block stack pool lane disposed beneath said upper stage sheet block pool lane and having a sheet-block stack output end;

a sheet block input transfer member disposed adjacent said input end of said upper stage sheet block pool lane;

a sheet-block stack output transfer member disposed adjacent said output end of said lower stage sheet-block stack pool lane;

wherein said upper stage sheet block pool lane comprises an endless drive body having a plurality of pushers at predetermined intervals, a sheet block pool table mounted beneath said endless drive body, and sheet block position regulating members mounted on opposing sides of said sheet block pool table, said sheet block pool table being movable between a closed position in which it supports sheet blocks and an open position in which it allows sheet blocks to fall onto said lower stage sheet-block stack pool lane;

wherein a plurality of upper sheet block pool stations are defined by said pushers and said sheet block position regulating members;

wherein said lower stage sheet-block stack pool lane comprises a vertically movable sheet-block stack pool table vertically movable relative to said upper stage sheet block pool lane, and sheet-block stack position regulating members mounted on opposing sides of said vertically movable sheet-block stack pool table; and wherein a plurality of lower sheet-block stack pool stations are defined on said vertically movable sheet-block stack pool table between said sheet-block stack position regulating members.

2. A formation unit as recited in claim 1, wherein said sheet block pool table comprises a means for intermittently dropping sheet blocks onto said sheet-block stack pool table to form stacks of sheet blocks thereon.

3. A formation unit as recited in claim 2, further comprising means for causing said sheet-block stack pool table to move vertically downwardly as sheet blocks are stacked thereon; and wherein said sheet-block stack position regulating members are stationary such that said sheet-block stack pool table is vertically movable relative thereto, and such that said sheet-block stack position regulating members guide sheet blocks as they are dropped by said sheet block pool table onto said sheet-block stack pool table.

4. A formation unit as recited in claim 1, wherein said lower stage sheet-block stack pool lane further comprises an endless drive body having a plurality of pushers and being disposed beneath said sheet-block stack pool table, said pushers of said endless drive body of said lower stage sheet-block stack pool lane further defining said lower sheet-block stack pool stations.

5. A stacking system for use in forming stacks of three-dimensional sheet blocks, said stacking system comprising:

a plurality of horizontally disposed sheet-block stack formation units aligned vertically with one another;

a sheet block distribution elevator mounted adjacent a first end of said plurality of formation units for supplying sheet blocks to said formation units;

a sheet-block stack collection elevator mounted adjacent a second end of said plurality of formation units for collecting sheet-block stacks from said formation units; and wherein each of said formation units comprises an upper stage sheet block pool lane having a sheet block input end, a lower stage sheet-block stack pool lane disposed beneath said upper stage sheet block pool lane and having a sheet-block stack output end, a sheet block input transfer member disposed adjacent said input end of said upper stage sheet block pool lane, a sheet-block stack output transfer member disposed adjacent said output end of said lower stage sheet-block stack pool lane, wherein said upper stage sheet block pool lane comprises an endless drive body having a plurality of pushers at predetermined intervals, a sheet block pool table mounted beneath said endless drive body, and sheet block position regulating members mounted on opposing sides of said sheet block pool table, said sheet block pool table being movable between a closed position in which it supports sheet blocks and an open position in which it allows sheet blocks to fall onto said lower stage sheet-block stack pool lane, wherein a plurality of upper sheet block pool stations are defined by said pushers and said sheet block position regulating members, wherein said lower stage sheet-block stack pool lane comprises a vertically movable sheet-block stack pool table vertically movable relative to said upper stage sheet block pool lane, and sheet-block stack position regulating members mounted on opposing sides of said vertically movable sheet-block stack pool table, and wherein a plurality of lower sheet-block stack pool stations are defined on said vertically movable sheet-block stack pool table between said sheet-block stack position regulating members.

6. A stacking system as recited in claim 5, wherein for each of said formation units, said sheet block pool table comprises a means for intermittently dropping sheet blocks onto said sheet-block stack pool table to form stacks of sheet blocks thereon.

7. A stacking system as recited in claim 6, wherein each of said formation units further comprises means for causing said sheet-block stack pool table to move vertically downwardly as sheet blocks are stacked thereon; and said sheet-block stack position regulating members of each of said formation units are stationary such that said sheet-block stack pool table is vertically movable relative thereto, and such that said sheet-block stack position regulating members guide sheet blocks as they are dropped by said sheet block pool table onto said sheet-block stack pool table.

8. A stacking system as recited in claim 5, wherein for each of said formation units, said lower stage sheet-block stack pool lane further comprises an endless drive body having a plurality of pushers and being disposed beneath said sheet-block stack pool table, said pushers of said endless drive body of said lower stage sheet-block stack pool lane further defining said lower sheet-block stack pool stations.

* * * * *